US012494582B2

(12) United States Patent
Yang

(10) Patent No.: US 12,494,582 B2
(45) Date of Patent: Dec. 9, 2025

(54) ANTENNA STRUCTURE AND ANTENNA SYSTEM

(71) Applicant: TP-LINK CORPORATION LIMITED, Hong Kong (CN)

(72) Inventor: Junyu Yang, Sichuan (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/703,317

(22) PCT Filed: Dec. 23, 2022

(86) PCT No.: PCT/CN2022/141678
§ 371 (c)(1),
(2) Date: Apr. 19, 2024

(87) PCT Pub. No.: WO2023/134429
PCT Pub. Date: Jul. 20, 2023

(65) Prior Publication Data

US 2025/0239775 A1 Jul. 24, 2025

(30) Foreign Application Priority Data

Jan. 13, 2022 (CN) ......................... 202210039312.8
Jan. 30, 2022 (CN) ......................... 202210114584.X

(51) Int. Cl.
*H01Q 9/16* (2006.01)
*H01Q 9/04* (2006.01)

(52) U.S. Cl.
CPC ............. *H01Q 9/16* (2013.01); *H01Q 9/0421* (2013.01)

(58) Field of Classification Search
None
See application file for complete search history.

(56) References Cited

U.S. PATENT DOCUMENTS 8,866,689 B2 * 10/2014 Islam ..................... H01Q 21/30 343/810
2015/0349418 A1 12/2015 Patron et al.
(Continued)

FOREIGN PATENT DOCUMENTS

CN 102629708 A 8/2012
CN 104993254 A 10/2015
(Continued)

*Primary Examiner* — Wilson Lee
(74) *Attorney, Agent, or Firm* — The Sun IP Law

(57) ABSTRACT

Provided are an antenna structure and an antenna system. The antenna structure includes a dielectric substrate, a two-wire parallel line, a first dipole antenna, a second dipole antenna and a reconfiguration structure; where the dielectric substrate includes a front surface and a back surface that are opposite each other; the two-wire parallel line includes a front conductor and a back conductor that are parallel to each other; the first dipole antenna includes a first radiation arm and a second radiation arm, and the second dipole antenna includes a third radiation arm and a fourth radiation arm; the reconfiguration structure includes a front unit, a back unit and a switching device; two ends of the switching device are connected to the front unit and the back unit respectively; and the two-wire parallel line is configured to transmit a radio frequency signal and a control signal.

20 Claims, 4 Drawing Sheets

(56) References Cited

U.S. PATENT DOCUMENTS

| | | | | |
|---|---|---|---|---|
| 2020/0251830 | A1* | 8/2020 | Charaabi | H01Q 5/42 |
| 2020/0411986 | A1* | 12/2020 | Cooper | H01Q 9/0421 |
| 2021/0384613 | A1* | 12/2021 | Koul | H01Q 5/307 |
| 2023/0208040 | A1* | 6/2023 | Zhang | H01Q 9/42 343/702 |
| 2025/0062527 | A1* | 2/2025 | Franson | H01Q 1/48 |

FOREIGN PATENT DOCUMENTS

| | | | |
|---|---|---|---|
| CN | 108649326 | A | 10/2018 |
| CN | 114374079 | A | 4/2022 |

* cited by examiner

ANTENNA STRUCTURE AND ANTENNA SYSTEM

CROSS-REFERENCE TO RELATED APPLICATION

The disclosure claims the benefit of priority to patent document No. 202210039312.8, filed on Jan. 13, 2022 and entitled "Antenna structure and antenna system" and patent document No. 202210114584.X, filed on Jan. 30, 2022 and entitled "Antenna structure and antenna system", which are incorporated herein in their entireties by reference.

TECHNICAL FIELD

The disclosure relates to the field of antennas, and particularly relates to an antenna structure and an antenna system.

BACKGROUND

An antenna is indispensable to a wireless communication system. As the information technology and the wireless communication technology are booming, the antenna technology is also progressing rapidly. In order to improve communication quality and reduce cost of the wireless communication system, the antenna has a tendency to be multi-functional, miniaturized, planarized and ultra-wide in bandwidth when designed. For the sake of multi-functionalization of a wireless communication antenna system, the reconfigurable antenna technology has become one of the decisive technologies of the modern wireless communication antenna system. Moreover, it is also a research focus in the field of antenna theory and design. A research emphasis is placed on polarization of a reconfigurable antenna, which can switch a polarization mode with the best communication quality in real time according to changes of a communication environment, reduce loss caused by polarization mismatch to the wireless communication system, and improve communication quality.

Polarization of the reconfigurable antenna is proposed in the prior art. However, there is no solution for how to reconfigure a radiation pattern of an antenna to adapt to a complex communication environment.

The above information disclosed in the background art is only intended to enhance understanding of the background art of technologies described herein, and therefore the background art possibly involves certain information that does not form the prior art known in China to those skilled in the art.

SUMMARY

A main objective of the disclosure is to provide an antenna structure and an antenna system.

According to an embodiment of the disclosure, an antenna structure is provided. The antenna structure includes a dielectric substrate, a two-wire parallel line, a first dipole antenna, a second dipole antenna and a reconfiguration structure. The dielectric substrate includes a front surface and a back surface that are opposite each other. The two-wire parallel line includes a front conductor and a back conductor, the front conductor is located on the front surface, and the back conductor is located on the back surface. The first dipole antenna includes a first radiation arm and a second radiation arm, and the second dipole antenna includes a third radiation arm and a fourth radiation arm. The first radiation arm and the third radiation arm are located on the front surface, and the second radiation arm and the fourth radiation arm are located on the back surface. The first radiation arm and the third radiation arm are connected to the front conductor, and the second radiation arm and the fourth radiation arm are connected to the back conductor. The reconfiguration structure includes a front unit, a back unit and a switching device. The front unit is located between the first radiation arm and the third radiation arm, and a first end of the front unit is connected to the front conductor. The back unit is located between the second radiation arm and the fourth radiation arm, and a first end of the back unit is connected to the back conductor. A first end of the switching device is electrically connected to a second end of the front unit, and a second end of the switching device is electrically connected to a second end of the back unit. The two-wire parallel line is configured to transmit a radio frequency signal and a control signal. The control signal is a signal for controlling an on-off state of the switching device.

In one or more embodiments, the antenna structure further includes a signal feed point and a reference point. The signal feed point is located on the front surface and on the same side of the first radiation arm and the third radiation arm, and the signal feed point is connected to the front conductor. The reference point is located on the back surface and on the same side of the second radiation arm and the fourth radiation arm, and the reference point is connected to the back conductor. The signal feed point and the reference point are configured to be connected to a coaxial line to receive the radio frequency signal and the control signal by means of the coaxial line.

In one or more embodiments, the front unit is perpendicular to the front conductor, and the back unit is perpendicular to the back conductor.

In one or more embodiments, a length of the front conductor and a length of the back conductor each equal a predetermined wavelength, and the predetermined wavelength is a wavelength corresponding to an operating frequency band of the antenna structure. The first end of the front unit is located in a middle of the front conductor, and the first end of the back unit is located in a middle of the back conductor. A length of the front unit and a length of the back unit each equal a quarter of the predetermined wavelength.

In one or more embodiments, the first dipole antenna is an H-type dipole, and the second dipole antenna is an H-type dipole.

In one or more embodiments, the first radiation arm and the third radiation arm are axisymmetric with respect to the front conductor, and the second radiation arm and the fourth radiation arm are axisymmetric with respect to the back conductor.

In one or more embodiments, the switching device is a PIN diode, a varactor diode or a micro electro mechanical system (MEMS) switch.

In one or more embodiments, the first dipole antenna and the second dipole antenna simultaneously operate in a case that the switching device is turned on, and the first dipole antenna or the second dipole antenna operates in a case that the switching device is turned off.

According to an embodiment of the disclosure, an antenna system is provided. The antenna system includes the antenna structure.

In one or more embodiments, the antenna structure includes a signal feed point and a reference point. The antenna system further includes a coaxial line. The coaxial line is connected to the signal feed point and the reference point.

BRIEF DESCRIPTION OF THE DRAWINGS

Accompanying drawings of the description serve as a constituent part of the disclosure to provide a further understanding of the disclosure. Illustrative examples of the disclosure and their descriptions serve to explain the disclosure and are not to be construed as unduly limiting the disclosure. In figures.

Figure 1:
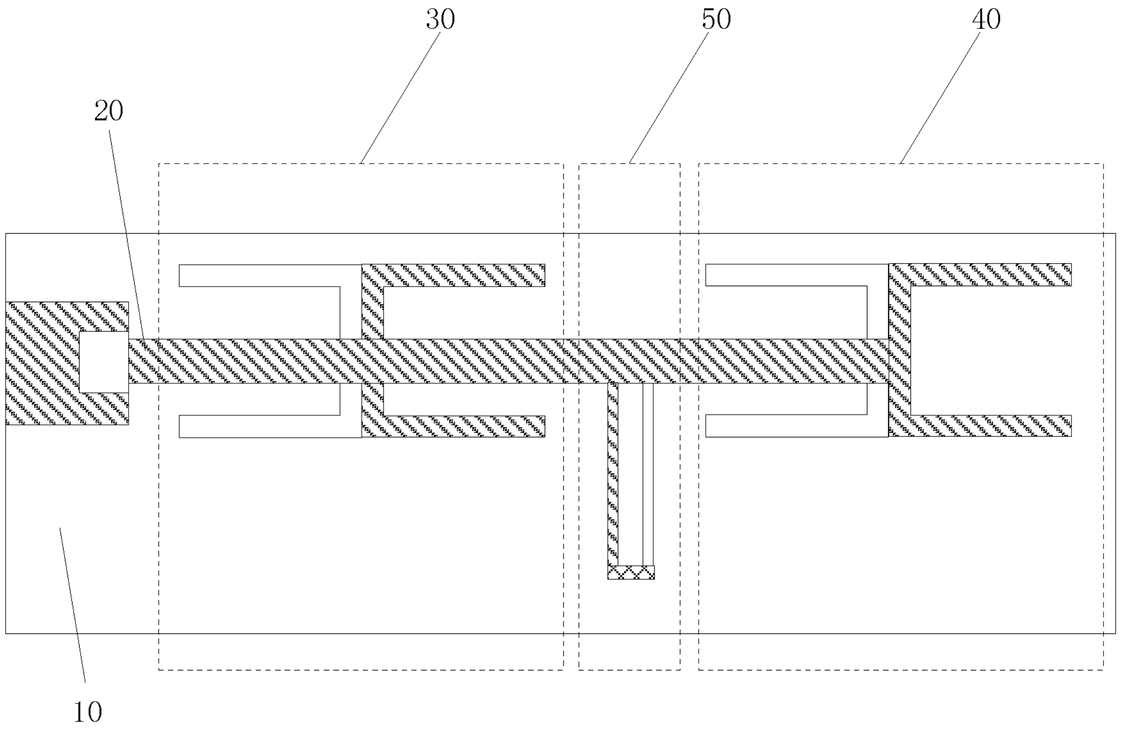
FIG. 1 shows a schematic diagram of an antenna structure according to an example of the disclosure.

The above figures include reference numerals as follows: 10. dielectric substrate, 20. two-wire parallel line, 30. first dipole antenna, 40. second dipole antenna, 50. reconfiguration structure, 60. signal feed point, 70. reference point, 101. front surface, 102. back surface, 201. front conductor, 202. back conductor, 301. first radiation arm, 302. second radiation arm, 401. third radiation arm, 402. fourth radiation arm, 501. front unit, 502. back unit, and 503. switching device.

DETAILED DESCRIPTION OF THE EMBODIMENTS

It should be noted that the following detailed description is illustrative and is intended to provide further explanation of the disclosure. All technical and scientific terms used herein have the same meaning as commonly understood by those of ordinary skill in the art to which the disclosure belongs unless otherwise defined.

It should be noted that the terms used herein are for the purpose of describing particular embodiments only and are not intended to be limiting of the illustrative embodiments according to the disclosure. As used herein, singular is also intended to include plural unless the context clearly points out singular or plural. In addition, it should be understood that terms "comprise" and/or "include" used in the description indicate the presence of features, steps, operations, devices, assemblies and/or their combinations.

It should be understood that in the situation that an element (for instance, a layer, film, region or substrate) is described as being "on" another element, the element can be directly on the other element or an intervening element can be present. Furthermore, in the description and claims, in the situation that an element is described as being "connected" to another element, the element can be "directly connected" to another element or "connected" to another element by means of a third element.

As described in the background art, in order to solve the problem that there is a lack of a method for reconfiguring a radiation pattern of an antenna in the prior art, the disclosure provides an antenna structure and an antenna system.

Figure 2:
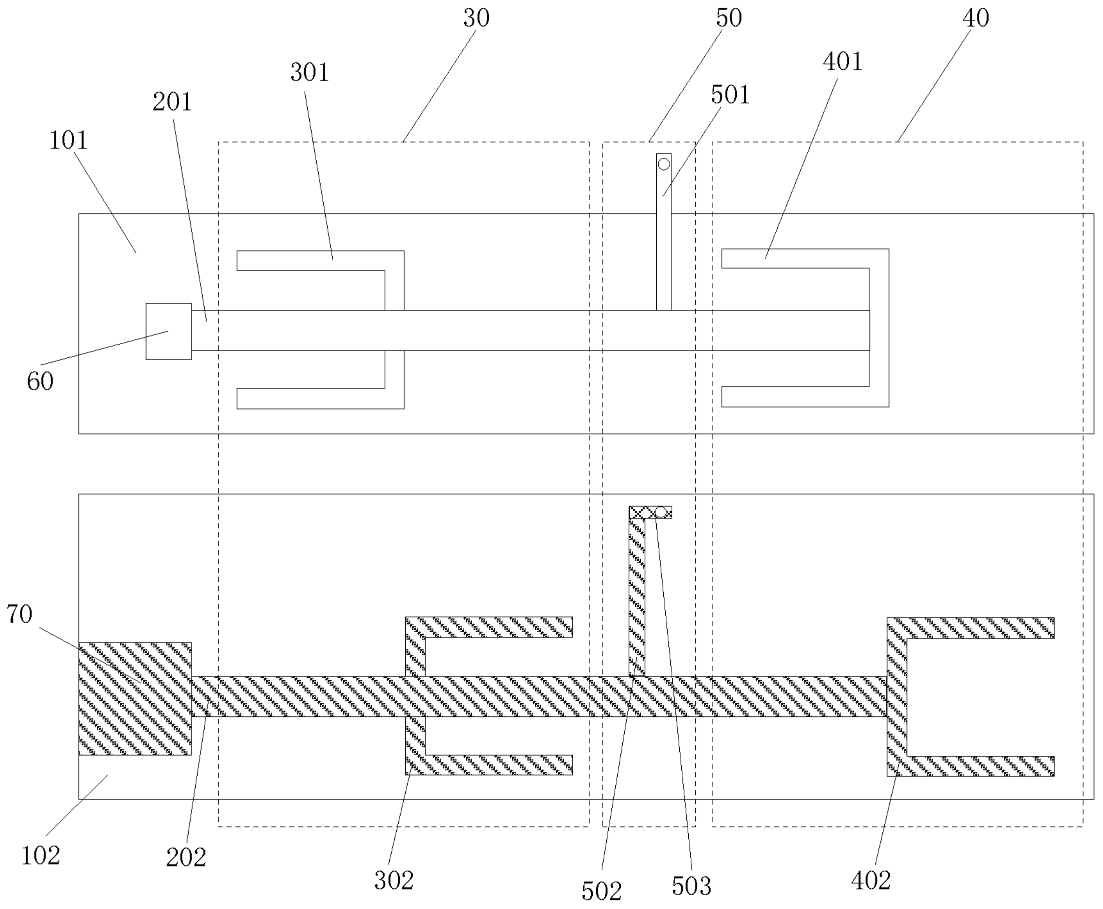
FIG. 2 shows a specific schematic diagram of an antenna structure according to an example of the disclosure.

According to a typical example of the disclosure, an antenna structure is provided. As shown in FIG. 1, the antenna structure includes a dielectric substrate 10, a two-wire parallel line 20, a first dipole antenna 30, a second dipole antenna 40 and a reconfiguration structure 50. As shown in FIG. 2, the dielectric substrate 10 includes a front surface 101 and a back surface 102 that are opposite each other. The two-wire parallel line 20 includes a front conductor 201 and a back conductor 202, the front conductor 201 is located on the front surface 101, and the back conductor 202 is located on the back surface 102. The first dipole antenna 30 includes a first radiation arm 301 and a second radiation arm 302, and the second dipole antenna 40 includes a third radiation arm 401 and a fourth radiation arm 402. The first radiation arm 301 and the third radiation arm 401 are located on the front surface 101, and the second radiation arm 302 and the fourth radiation arm 402 are located on the back surface 102. The first radiation arm 301 and the third radiation arm 401 are connected to the front conductor 201, and the second radiation arm 302 and the fourth radiation arm 402 are connected to the back conductor 202. The reconfiguration structure 50 includes a front unit 501, a back unit 502 and a switching device 503. The front unit 501 is located between the first radiation arm 301 and the third radiation arm 401, and a first end of the front unit 501 is connected to the front conductor 201. The back unit 502 is located between the second radiation arm 302 and the fourth radiation arm 402, and a first end of the back unit 502 is connected to the back conductor 202. A first end of the switching device 503 is electrically connected to a second end of the front unit 501, and a second end of the switching device 503 is electrically connected to a second end of the back unit 502. The two-wire parallel line 20 is configured to transmit a radio frequency signal and a control signal. The control signal is a signal for controlling an on-off state of the switching device.

The antenna structure includes a dielectric substrate, a two-wire parallel line, a first dipole antenna, a second dipole antenna and a reconfiguration structure. The dielectric substrate includes a front surface and a back surface that are opposite each other. The two-wire parallel line includes a front conductor and a back conductor that are parallel to each other. The first dipole antenna includes a first radiation arm and a second radiation arm, and the second dipole antenna includes a third radiation arm and a fourth radiation arm. The reconfiguration structure includes a front unit, a back unit and a switching device. Two ends of the switching device are connected to the front unit and the back unit respectively. The two-wire parallel line is configured to transmit a radio frequency signal and a control signal. Compared with the problem of lack of a method for reconfiguring a radiation pattern of an antenna in the prior art, the antenna structure in the disclosure has effects that the switching device is controlled to be closed by means of the control signal, such that impedance or phase value of the reconfiguration structure is introduced into the antenna structure. Therefore, a shape of a radiation pattern is changed, a size of a gain and a pitch angle of a radiation beam are switched, and the radiation pattern of an antenna is reconfigured. Moreover, in the disclosure, the radio frequency signal and the control signal are transmitted by the two-wire parallel line. That is, wireless performance of the same transmission structure and multiplexing of the control signal are achieved, and an influence of a control circuit on antenna radiation is mitigated. Compared with the prior art in which a control signal and a radio frequency signal are transmitted in different ways, the disclosure simplifies a design and ensures that manufacturing cost of the antenna structure is relatively low. In addition, since the switching device is loaded between the front unit and the back unit, rather than on a main radiation structure of an antenna, an influence of insertion loss of the switching device on performance of the antenna is alleviated.

Specifically, the above dielectric substrate includes a poly tetra fluor ethylene (PTFE) printed circuit board (PCB), and certainly may be a different plate. A second end of a first stub and a second end of a second stub are connected through a metallized via hole on the dielectric substrate, and the switching device is placed.

According to a particular example of the disclosure, as shown in FIG. 2, the antenna structure further includes a signal feed point 60 and a reference point 70. The signal feed point 60 is located on the front surface 101 and on the same side of the first radiation arm 301 and the third radiation arm 401, and the signal feed point 60 is connected to the front conductor 201. The reference point 70 is located on the back surface 102 and on the same side of the second radiation arm 302 and the fourth radiation arm 402, and the reference point 70 is connected to the back conductor 202. The signal feed point 60 and the reference point 70 are configured to be connected to a coaxial line to receive the radio frequency signal and the control signal by means of the coaxial line. The signal feed point and the reference point receive the radio frequency signal and the control signal by means of the coaxial line. In this way, it is further ensured that the radio frequency signal is stably transmitted, and the on-off state of the switching device is further controlled through input of an electrical signal, such that a radiation pattern of an antenna is reconfigured.

Specifically, the coaxial line includes an inner conductor and an outer conductor. The inner conductor of the coaxial line is connected to the signal feed point of the dielectric substrate. The outer conductor of the coaxial line is connected to the reference point of the dielectric substrate. The signal feed point serves as an input point of the control signal and the radio frequency signal. The reference point serves as a reference point of the radio frequency signal and a low potential reference point of the control signal. The radio frequency signal is stably input. The switching device is turned on or off by changing an input value of a control level, such that impedance or phase input of the reconfiguration structure is changed, and the radiation pattern of the antenna is changed.

In order to further ensure better performance of the antenna structure, according to another particular example of the disclosure, as shown in FIG. 2, the front unit 501 is perpendicular to the front conductor 201, and the back unit 502 is perpendicular to the back conductor 202. Certainly, in an actual application process, the front unit may not be perpendicular to the front conductor, and the back unit may not be perpendicular to the back conductor. In this case, it is required to arrange other additional structures to adjust a non-perpendicular state to have the same performance as that of a perpendicular state.

According to another particular example of the disclosure, a length of the front conductor and a length of the back conductor each equal a predetermined wavelength, and the predetermined wavelength is a wavelength corresponding to an operating frequency band of the antenna structure. The first end of the front unit is located in a middle of the front conductor, and the first end of the back unit is located in a middle of the back conductor. That is, the front unit and the back unit each are located at a ½ position of the predetermined wavelength. A length of the front unit and a length of the back unit each equal a quarter of the predetermined wavelength.

According to a particular example of the disclosure, the first dipole antenna is an H-type dipole, and the second dipole antenna is an H-type dipole.

According to another particular example of the disclosure, as shown in FIG. 2, the first radiation arm 301 and the third radiation arm 401 are axisymmetric with respect to the front conductor 201, and the second radiation arm 302 and the fourth radiation arm 402 are axisymmetric with respect to the back conductor 202.

It should be noted that a positional relation between the first radiation arm and the third radiation arm is not limited to axisymmetry with respect to the front conductor, and a positional relation between the second radiation arm and the fourth radiation arm is not limited to axisymmetry with respect to the back conductor.

The switching device may be any suitable two-terminal switch in the prior art, such as a diode. According to another particular example of the disclosure, the switching device may be a PIN diode, a varactor diode or a micro electro mechanical system (MEMS) switch. In a case that the switching device is a PIN diode, the reconfiguration structure is configured for impedance adjustment to serve as a variable impedance loading section. In a case that the switching device is a varactor diode, the reconfiguration structure is configured for impedance adjustment and phase shift to serve as a phase shifting section.

The PIN diode is a P-I-N structure diode formed by adding a thin low-doped intrinsic semiconductor layer between P and N semiconductor materials.

In a particular example, the two-wire parallel line is required to supply power to the first dipole antenna and the first dipole antenna, and the control signal is required to generate a potential difference for the PIN diode/varactor diode. By designing a variable impedance loading section (for the PIN diode) or a phase shifting section (for the varactor diode), the front conductor and the back conductor as transmission lines can be simultaneously used as control signal input lines of the PIN diode, and the radio frequency signal and the control signal are simultaneously fed through a radio frequency coaxial line welded at a front end. Therefore, wireless performance of the same transmission structure and multiplexing of the control signal can be achieved, an influence of the control circuit on antenna radiation can be greatly reduced, a design can be simplified and cost can be reduced. Moreover, since the switching device is loaded on an impedance/phase introduction section rather than a main radiation structure of an antenna, an influence of insertion loss of the switching device on performance of the antenna is reduced.

According to a particular example of the disclosure, the first dipole antenna and the second dipole antenna simultaneously operate in a case that the switching device is turned on, and the first dipole antenna or the second dipole antenna operates in a case that the switching device is turned off.

In a particular example, as shown in FIG. 1, the signal feed point and the reference point are located on one side of the first dipole antenna away from the second dipole antenna. In cases that a PIN diode is used and an input control level is a high level, the switching device is turned on, and the reconfiguration structure is equivalent to a parallel ¼-wavelength short-circuit line. For a loading position of the structure on the two-wire parallel line, input impedance is infinitely small for current balance, and the first dipole antenna and the second dipole antenna simultaneously operate. In a case that an input level is a low level, the switching device is turned off, and the reconfiguration structure is equivalent to a parallel ¼-wavelength open-circuit line. For a loading position of the structure on the two-wire parallel line, input impedance is infinitely great, a signal is totally reflected at the position, and only the first dipole antenna operates. In cases that a varactor diode is used and an input level is a low level, the switching device is turned off, and the reconfiguration structure is equivalent to a parallel ¼ wavelength open-circuit line. For a loading position of the structure on the two-wire parallel line, input impedance is infinitely great, a signal is totally reflected at the position, and only the first dipole antenna operates. In cases that an input control level corresponds to a varactor diode turned on and no capacitance is introduced, the switching device is turned on, no capacitance is loaded, the reconfiguration structure is equivalent to a ¼ wavelength parallel short-circuit line. For a loading position of the structure on the two-wire parallel line, input impedance is infinitely small for current balance, and the first dipole antenna and the second dipole antenna simultaneously operate. In cases that the input control level corresponds to a strain capacitor diode turned on and capacitance is introduced, the switching device is turned on, capacitance is loaded, a current phase is advanced, and the reconfiguration structure is equivalent to a ¼ wavelength parallel open-circuit line for phase shift. For a loading position of the structure on the two-wire parallel line, input impedance is infinitely small, and the first dipole antenna and the second dipole antenna simultaneously operate and supply power to unequal phases.

As shown in FIG. 2, when the switching device is turned off, the reconfiguration structure is in an open-circuit state, impedance introduced at the point is infinitely great, total reflection occurs when a signal reaches the parallel position of the reconfiguration structure, only the first dipole antenna operates, and a low-gain wide-beam mode is achieved. As shown in FIG. 2, when a direct current bias voltage is applied to a coaxial core, the switch is turned on, the reconfiguration structure is in a short-circuit state, impedance introduced at the point is infinitely small, a stub does not affect an original structure, the first dipole antenna and the second dipole antenna simultaneously operate, and a high-gain narrow-beam mode is achieved.

Figure 3:
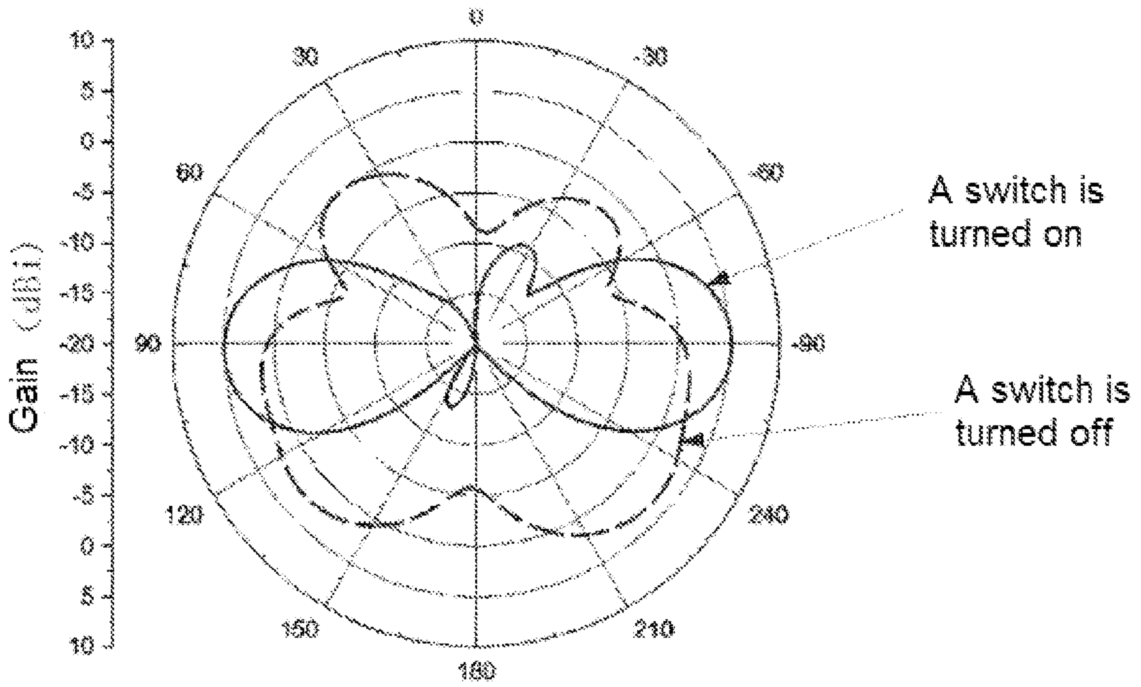
FIG. 3 shows a schematic diagram of a radiation direction of a pitch plane of an antenna structure according to an example of the disclosure.
Figure 4:
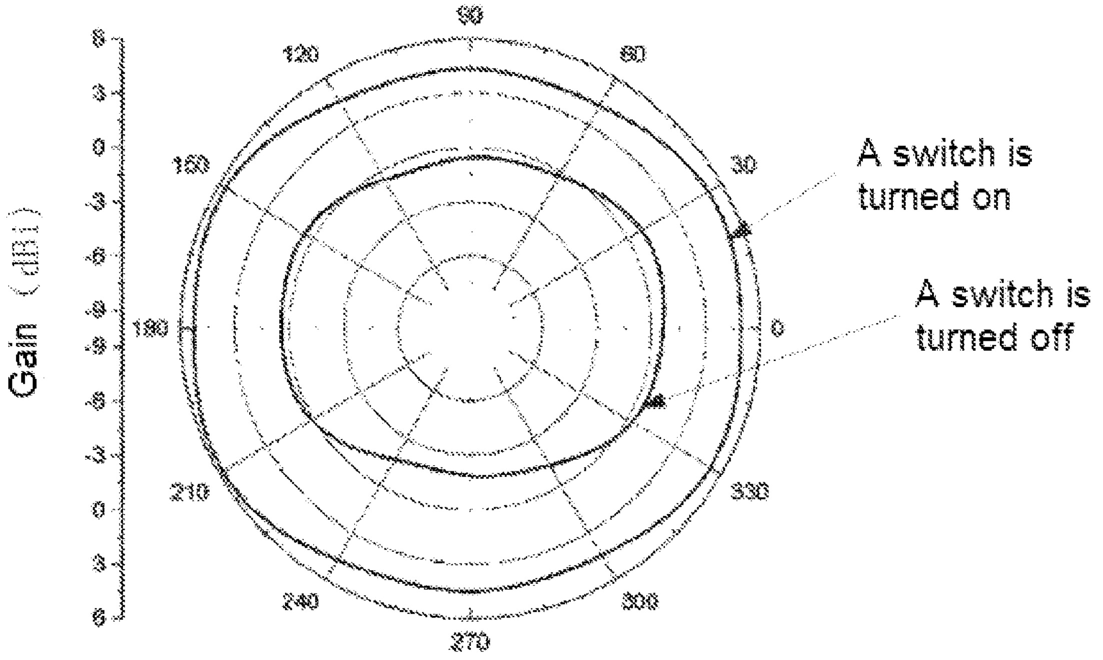
FIG. 4 shows a schematic diagram of a radiation direction of a horizontal plane of an antenna structure according to an example of the disclosure.
Figure 5:
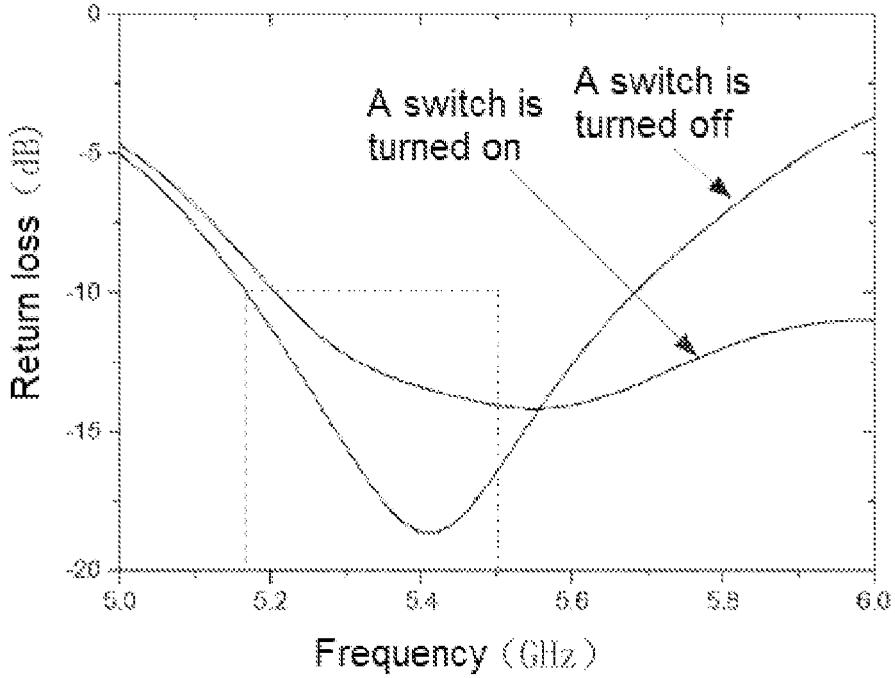
FIG. 5 shows a schematic diagram of a relation between a frequency and return loss according to an example of the disclosure.

Specifically, as shown in FIGS. 3 and 4, when the switching device is turned on, a maximum gain direction is on a horizontal plane. In this case, a maximum gain is about 5 dBi, and a 3 dB beam width is about 45 degrees. When the switching device is turned off, an antenna maximum gain direction is inclined downwards by 45 degrees (0=about 135 degrees). In this case, a maximum gain is about 3 dBi, and a 3 dB beam width is about 80 degrees. As shown in FIG. 5, return loss of the antenna in a case of a frequency band of 5.15 GHz-5.5 GHz is less than-10 dB when the switching device is turned on or off, and desirable matching and radiation efficiency can be obtained.

In a particular example, the antenna structure can achieve omnidirectional radiation in an azimuth plane. A household WIFI communication system can operate in a frequency band of 2 GHz-7 GHz. Omnidirectional radiation in the azimuth plane is achieved, a tilt angle of a beam in a pitch plane, a gain of an antenna and a width of a beam are adjustable, and the antenna structure is suitable for a household communication product.

According to another typical example of the disclosure, an antenna system is provided. The antenna system includes the above antenna structure.

The antenna system includes the antenna structure. Compared with the problem of lack of a method for reconfiguring a radiation pattern of an antenna in the prior art, the antenna system in the disclosure has effects that the switching device is controlled to be closed by means of the control signal, such that impedance or phase value of the reconfiguration structure is introduced into the antenna structure. Therefore, a shape of a radiation pattern is changed, a size of a gain and a pitch angle of a radiation beam are switched, and the radiation pattern of an antenna is reconfigured. Moreover, in the disclosure, the radio frequency signal and the control signal are transmitted by the two-wire parallel line. That is, wireless performance of the same transmission structure and multiplexing of the control signal are achieved, and an influence of a control circuit on antenna radiation is mitigated. Compared with the prior art in which a control signal and a radio frequency signal are transmitted in different ways, the disclosure simplifies a design and ensures that manufacturing cost of the antenna structure is relatively low. In addition, since the switching device is loaded between the front unit and the back unit, rather than on a main radiation structure of an antenna, an influence of insertion loss of the switching device on performance of the antenna is alleviated.

In a particular example, the antenna system has a small size of 90 mm*12 mm*0.75 mm, and therefore is suitable for a miniaturized terminal communication product.

According to a particular example of the disclosure, the antenna structure includes a signal feed point and a reference point. The antenna system further includes a coaxial line. The coaxial line includes an inner conductor and an outer conductor. The inner conductor of the coaxial line is connected to the signal feed point, and the outer conductor of the coaxial line is connected to the reference point.

In the above examples of the disclosure, the descriptions of various examples are emphasized on their respective aspects, and for a portion of a certain example that is not described in detail, reference can be made to the associated descriptions of other examples.

From the above description, it can be seen that the above example of the disclosure achieves technical effects as follows:

1) The antenna structure in the disclosure includes a dielectric substrate, a two-wire parallel line, a first dipole antenna, a second dipole antenna and a reconfiguration structure. The dielectric substrate includes a front surface and a back surface that are opposite each other. The two-wire parallel line includes a front conductor and a back conductor that are parallel to each other. The first dipole antenna includes a first radiation arm and a second radiation arm, and the second dipole antenna includes a third radiation arm and a fourth radiation arm. The reconfiguration structure includes a front unit, a back unit and a switching device. Two ends of the switching device are connected to the front unit and the back unit respectively. The two-wire parallel line is configured to transmit a radio frequency signal and a control signal. Compared with the problem of lack of a method for reconfiguring a radiation pattern of an antenna in the prior art, the antenna structure in the disclosure has effects that the switching device is controlled to be closed by means of the control signal, such that impedance or phase value of the reconfiguration structure is introduced into the antenna structure. Therefore, a shape of a radiation pattern is changed, a size of a gain and a pitch angle of a radiation beam are switched, and the radiation pattern of an antenna is reconfigured. Moreover, in the disclosure, the radio frequency signal and the control signal are transmitted by the two-wire parallel line. That is, wireless performance of the same transmission structure and multiplexing of the control signal are achieved, and an influence of a control circuit on antenna radiation is mitigated. Compared with the prior art in which a control signal and a radio frequency signal are transmitted in different ways, the disclosure simplifies a design and ensures that manufacturing cost of the antenna structure is relatively low. In addition, since the switching device is loaded between the front unit and the back unit, rather than on a main radiation structure of an antenna, an influence of insertion loss of the switching device on performance of the antenna is alleviated.

2) The antenna system in the disclosure includes the above antenna structure. Compared with the problem of lack of a method for reconfiguring a radiation pattern of an antenna in the prior art, the antenna structure in the disclosure has effects that the switching device is controlled to be closed by means of the control signal, such that impedance or phase value of the reconfiguration structure is introduced into the antenna structure. Therefore, a shape of a radiation pattern is changed, a size of a gain and a pitch angle of a radiation beam are switched, and the radiation pattern of an antenna is reconfigured. Moreover, in the disclosure, the radio frequency signal and the control signal are transmitted by the two-wire parallel line. That is, wireless performance of the same transmission structure and multiplexing of the control signal are achieved, and an influence of a control circuit on antenna radiation is mitigated. Compared with the prior art in which a control signal and a radio frequency signal are transmitted in different ways, the disclosure simplifies a design and ensures that manufacturing cost of the antenna structure is relatively low. In addition, since the switching device is loaded between the front unit and the back unit, rather than on a main radiation structure of an antenna, an influence of insertion loss of the switching device on performance of the antenna is alleviated.

The above examples are merely preferred examples of the disclosure and are not intended to limit the disclosure. Various changes and modifications can be made on the disclosure by those skilled in the art. Any modifications, equivalent substitutions, improvements, etc. within the spirit and principles of the disclosure are intended to be included within the scope of protection of the disclosure.

What is claimed is:

1. An antenna structure, comprising:

a dielectric substrate, which comprises a front surface and a back surface that are opposite each other;

a two-wire parallel line, which comprises a front conductor and a back conductor, wherein the front conductor is located on the front surface and the back conductor is located on the back surface;

a first dipole antenna and a second dipole antenna, wherein the first dipole antenna comprises a first radiation arm and a second radiation arm, the second dipole antenna comprises a third radiation arm and a fourth radiation arm, the first radiation arm and the third radiation arm are located on the front surface, the second radiation arm and the fourth radiation arm are located on the back surface, the first radiation arm and the third radiation arm are connected to the front conductor, and the second radiation arm and the fourth radiation arm are connected to the back conductor; and a reconfiguration structure, which comprises a stub and a switching device, wherein the stub comprises a front unit located on the front surface and a back unit located on the back surface, the front unit is located between the first radiation arm and the third radiation arm, and a first end of the front unit is connected to the front conductor; the back unit is located between the second radiation arm and the fourth radiation arm, and a first end of the back unit is connected to the back conductor; and a first end of the switching device is electrically connected to a second end of the front unit, and a second end of the switching device is electrically connected to a second end of the back unit; wherein the two-wire parallel line is configured to transmit a radio frequency signal and a control signal, and the control signal is a signal for controlling an on-off state of the switching device.

2. The antenna structure according to claim 1, further comprising:

a signal feed point, which is located on the front surface and on the same side of the first radiation arm and the third radiation arm, wherein the signal feed point is connected to the front conductor; and a reference point, which is located on the back surface and on the same side of the second radiation arm and the fourth radiation arm, wherein the reference point is connected to the back conductor, and the signal feed point and the reference point are configured to be connected to a coaxial line to receive the radio frequency signal and the control signal by means of the coaxial line.

3. The antenna structure according to claim 1, wherein the front unit is perpendicular to the front conductor, and the back unit is perpendicular to the back conductor.

4. The antenna structure according to claim 3, wherein a length of the front conductor and a length of the back conductor each equal a predetermined wavelength, the predetermined wavelength is a wavelength corresponding to an operating frequency band of the antenna structure, the first end of the front unit is located in a middle of the front conductor, the first end of the back unit is located in a middle of the back conductor, and a length of the front unit and a length of the back unit each equal a quarter of the predetermined wavelength.

5. The antenna structure according to claim 1, wherein the first dipole antenna is an H-type dipole, and the second dipole antenna is an H-type dipole.

6. The antenna structure according to claim 5, wherein the first radiation arm and the third radiation arm are axisymmetric with respect to the front conductor, and the second radiation arm and the fourth radiation arm are axisymmetric with respect to the back conductor.

7. The antenna structure according to claim 1, wherein the switching device is a PIN diode, a varactor diode or a micro electro mechanical system (MEMS) switch.

8. The antenna structure according to claim 1, wherein the first dipole antenna and the second dipole antenna simultaneously operate in a case that the switching device is turned on, and the first dipole antenna or the second dipole antenna operates in a case that the switching device is turned off.

9. An antenna system, comprising the antenna structure according to claim 1.

10. The antenna system according to claim 9, wherein the antenna structure comprises a signal feed point and a reference point, and the antenna system further comprises:

a coaxial line, which is connected to the signal feed point and the reference point.

11. The antenna structure according to claim 7, further comprising:

a signal feed point, which is located on the front surface and on the same side of the first radiation arm and the third radiation arm, wherein the signal feed point is connected to the front conductor; and a reference point, which is located on the back surface and on the same side of the second radiation arm and the fourth radiation arm, wherein the reference point is connected to the back conductor, and the signal feed point and the reference point are configured to be connected to a coaxial line to receive the radio frequency signal and the control signal by means of the coaxial line.

12. The antenna structure according to claim 7, wherein the front unit is perpendicular to the front conductor, and the back unit is perpendicular to the back conductor.

13. The antenna structure according to claim 8, further comprising:

a signal feed point, which is located on the front surface and on the same side of the first radiation arm and the third radiation arm, wherein the signal feed point is connected to the front conductor; and a reference point, which is located on the back surface and on the same side of the second radiation arm and the fourth radiation arm, wherein the reference point is connected to the back conductor, and the signal feed point and the reference point are configured to be connected to a coaxial line to receive the radio frequency signal and the control signal by means of the coaxial line.

14. The antenna structure according to claim 8, wherein the front unit is perpendicular to the front conductor, and the back unit is perpendicular to the back conductor.

15. The antenna system according to claim 9, wherein the antenna structure further comprises:

a signal feed point, which is located on the front surface and on the same side of the first radiation arm and the third radiation arm, wherein the signal feed point is connected to the front conductor; and a reference point, which is located on the back surface and on the same side of the second radiation arm and the fourth radiation arm, wherein the reference point is connected to the back conductor, and the signal feed point and the reference point are configured to be connected to a coaxial line to receive the radio frequency signal and the control signal by means of the coaxial line.

16. The antenna system according to claim 9, wherein the front unit is perpendicular to the front conductor, and the back unit is perpendicular to the back conductor.

17. The antenna system according to claim 16, wherein a length of the front conductor and a length of the back conductor each equal a predetermined wavelength, the predetermined wavelength is a wavelength corresponding to an operating frequency band of the antenna structure, the first end of the front unit is located in a middle of the front conductor, the first end of the back unit is located in a middle of the back conductor, and a length of the front unit and a length of the back unit each equal a quarter of the predetermined wavelength.

18. The antenna system according to claim 9, wherein the first dipole antenna is an H-type dipole, and the second dipole antenna is an H-type dipole.

19. The antenna system according to claim 18, wherein the first radiation arm and the third radiation arm are axisymmetric with respect to the front conductor, and the second radiation arm and the fourth radiation arm are axisymmetric with respect to the back conductor.

20. The antenna system according to claim 9, wherein the first dipole antenna and the second dipole antenna simultaneously operate in a case that the switching device is turned on, and the first dipole antenna or the second dipole antenna operates in a case that the switching device is turned off.

* * * * *